United States Patent [19]

Fennemann

[11] Patent Number: 5,116,798
[45] Date of Patent: May 26, 1992

[54] PROCESS FOR PRODUCING CATALYSTS AND IMPREGNATING SOLUTIONS AND CATALYSTS PRODUCED BY THE PROCESS

[75] Inventor: Wolfgang Fennemann, Karben, Fed. Rep. of Germany

[73] Assignee: Metallgesellschaft Aktiengesellschaft, Frankfurt am Main, Fed. Rep. of Germany

[21] Appl. No.: 674,759

[22] Filed: Mar. 22, 1991

[30] Foreign Application Priority Data

Mar. 23, 1990 [DE] Fed. Rep. of Germany ....... 4009327

[51] Int. Cl.$^5$ .................. B01J 23/22; B01J 27/055
[52] U.S. Cl. ................................. 502/218; 423/535
[58] Field of Search .................. 502/218; 423/535

[56] References Cited

U.S. PATENT DOCUMENTS

| 4,126,578 | 11/1978 | Sherif | 502/218 X |
| 4,184,980 | 1/1980 | Sherif et al. | 502/218 |
| 4,193,894 | 3/1980 | Villadsen | 502/218 |
| 4,431,573 | 2/1984 | Fennemann et al. | 502/218 |
| 4,539,309 | 9/1985 | Meissner et al. | 502/344 X |
| 4,680,281 | 7/1987 | Fennemann | 502/218 |
| 4,766,104 | 8/1988 | Fennemann | 502/218 |

FOREIGN PATENT DOCUMENTS 0047540 3/1982 European Pat. Off.
0151823 1/1984 European Pat. Off.

Primary Examiner—W. J. Shine
Attorney, Agent, or Firm—Herbert Dubno; Jonathan Myers

[57] ABSTRACT

A catalyst which contains vanadium oxide and alkali compounds and serves to oxidize $SO_2$ to $SO_3$ is produced in that prefabricated carrier bodies are impregnated with impregnating solutions which contain vanadium and alkalis, the impregnated carrier bodies are thermally treated at elevated temperature and this is followed by an activation under oxidizing conditions at a temperature from 750° C. to 1000° C. In the production of the impregnating solutions, fine-grained $V_2O_5$ is dissolved in an acid aqueous medium with addition of a reducing agent and a reduction to form $VO^{2-}$ is effected, acid and reducing agent are used in approximately stoichiometric amounts for the dissolution and reduction of $V_2O_5$. The alkalis are used in the form of salts. The solution is adjusted to contain $SO_4$ in an amount which is sufficient to combine the entire amount of the alkalis in neutral sulfates during the drying and activation.

13 Claims, No Drawings

PROCESS FOR PRODUCING CATALYSTS AND IMPREGNATING SOLUTIONS AND CATALYSTS PRODUCED BY THE PROCESS

FIELD OF THE INVENTION

My present invention relates to a process of producing a catalyst which contains vanadium oxide compounds and alkali compounds and serves to oxidize $SO_2$ to $SO_3$. More particularly the invention relates to a process wherein prefabricated carrier bodies are impregnated with impregnating solutions which contain vanadium and alkalis, the impregnated carrier bodies are thermally treated at elevated temperature and this is followed by an activation under oxidizing conditions at a temperature from 750° to 1000° C.

BACKGROUND OF THE INVENTION

The catalytic reaction of $SO_2$ with oxygen to $SO_3$ in contact process plants is presently effected with the aid of catalysts which comprise $V_2O_5$ and alkali sulfate as active substances. Such catalysts are required to effect a high conversion of $SO_2$ to $SO_3$ at a low reaction temperature and should not be susceptible to damage at elevated temperatures and should have a high mechanical strength. These properties depend largely on the manner in which the catalyst bodies have been produced.

The impregnation of prefabricated carrier bodies with a solution of the active substances affords several advantages over the use of catalysts which have been produced in a single stage, in which carrier substances and active substances are mixed and are subsequently shaped to form catalyst bodies.

The prefabricated carrier bodies usually consist of $SiO_2$ and can be produced irrespective of the active substances so that carrier bodies can be made which have a consistent composition, a large internal surface area, and a high mechanical strength. The impregnation results in a uniform distribution of the active substances throughout the carrier bodies so that the resulting catalyst bodies have a uniform composition and varying distributions of impregnants will be avoided. The catalysts have high conversion activities.

The production of catalysts by an impregnation of prefabricated carrier bodies has been described in EP 0 047 540 (see U.S. Pat. No. 4,431,573). The impregnation is effected with an impregnating solution which per liter contains 600 to 1100 g $5H_2SO_4$ and 140 to 830 g $V_2O_5$ and alkali sulfate and is at a temperature between 60° C. an the boiling temperature of the impregnating solution that is employed. The impregnated carrier bodies are dried with agitation at a maximum drying temperature of 700° C. The catalysts have very high conversion activities even at low temperatures and are mechanically stable even at high temperatures.

From EP 0 151 823 (see U.S. Pat. Nos. 4,680,281 and 4,766,104) it is known that the conversion activity of such catalysts produced in two stages can be further increased by activating the dried catalysts under oxidizing conditions at a temperature from 750° to 1000° C. Drying and activation, however, result in a decomposition of the sulfates so that sulfuric acid mists escape. Expensive measures must be adopted in order to avoid emissions of pollutants.

Published German Patent Application 3022 894 describes for the production of fluidized bed catalysts a two-stage process in which carrier bodies are employed which contain $Al_2O_3$ not in excess of 4% and are impregnated with a weak sulfuric acid solution of vanadyl oxysulfate which contains tetravalent vanadium, and of potassium hydrogen sulfate. This is succeeded by a drying at temperatures from 150° to 250° C. The carrier bodies or the impregnated carrier bodies are hardened at temperatures not in excess of 600° C., preferably between 200° and 400° C. In that process the drying and hardening of the impregnated carrier bodies will also result in a formation of sulfuric acid mists, particularly during the activation described hereinbefore.

OBJECTS OF THE INVENTION

It is an object of the invention to ensure in the production of catalysts effected in two stages and with use of acid impregnating solutions that an evolution of sulfuric acid mists during the drying and activation of the impregnated carrier bodies will entirely be avoided or will be minimized and to produce impregnating solutions which contain active substances in a high concentration.

Another object of the invention is to provide improved catalyst bodies.

It is also an object of the invention to provide an improved contact catalyst process for converting $SO_2$ to $SO_3$. Still another object of my invention is to provide an improved method of making a catalyst for use in contact catalysts whereby the aforedescribed drawbacks are avoided.

DESCRIPTION OF THE INVENTION

That object is accomplished in accordance with the invention in that in the production of the impregnating solution fine-grained $V_2O_5$ is dissolved in an acid aqueous medium with addition of a reducing agent and a reduction to form $VO^{2-}$ is effected, acid and reducing agent are used in approximately stoichiometric amounts for the dissolution and reduction of $V_2O_5$, the alkalis are used in the form of salts and the solution is adjusted to contain $SO_4$ in an amount which is sufficient to combine the entire amount of the alkalis in neutral sulfates during the drying and activation.

More specifically, the process of the invention comprises the steps of:

(a) forming an impregnating solution by dissolving fine-grain $V_2O_5$ in an aqueous acid medium containing a reducing agent effective to form $VO^{2-}$ and with an acid and the reducing agent in approximately stoichiometric amounts for the dissolution and reduction of the $V_2O_5$, the solution containing alkalis adapted to form the alkali compounds in the form of salts;

(b) adjusting the solution so that it contains $SO_4^=$ in an amount sufficient to combine all of the alkalis in the solution in the form of neutral sulfates upon impregnation of the solution into prefabricated carrier bodies and during subsequent drying and activation of impregnated carrier bodies;

(c) impregnating prefabricated carrier bodies with the impregnating solution of step (b) to form solution-impregnated carrier bodies;

(d) drying the solution-impregnated carrier bodies at an elevated temperature to form catalyst bodies; and (e) activating the catalyst bodies by heating same under oxidizing conditions to a temperature of 750° to 1000° C. to produce a catalyst containing vanadium oxide compounds and alkali compounds and capable of oxidizing $SO_2$ to $SO_3$.

The acids employed may consist of organic acids—such as formic acid, acetic acid, oxalic acid, tartaric acid, citric acid—or sulfuric acid and the sulfuric acid may optionally be formed in the aqueous phase by a reaction of sulfur dioxide or acid sulfites with $V_2O_5$. It is possible to use two or more acids in combination.

Because oxalic acid, citric acid and tartaric acid will reduce $V_2O_5$, no reducing agent will be required if such acids are employed. Where acetic acid and formic acid are employed it will be necessary to use reducing agents, such as $SO_2$, alkali sulfites, alkali bisulfites or hydrazine sulfate. Sulfuric acid is preferably used together with $SO_2$ as a reducing agent. If organic acids are used which act also as reducing agents, they must be employed in a correspondingly larger amount. A surplus will not be disturbing but will add to the costs because organic acids are relatively expensive.

In all cases the following substances are required in stoichiometric amounts:

a) reducing agent for reducing $V^{5+}$ to $VO^{2+}$;
b) acid for forming vanadyl salts such as $VOSO_4$ or $VO(HCOO)_2$.

In practice a surplus up to 10% will still be regarded as stoichiometric and will be required to compensate metering inaccuracies and to effect a complete reaction as soon as possible. The expression "approximately stoichiometric" includes such a surplus.

The alkalis may be used in the form of salts of the above-mentioned acids. Because they will anyway be converted to sulfates during their subsequent use as sulfuric acid catalysts and sulfates are particularly inexpensive, it is preferred to use sulfates directly, at least in part. If alkali sulfites or bisulfites are used as reducing agents they will automatically be present in the solution as neutral sulfates.

Salts of potassium, cesium and sodium will primarily be used. The salts are preferably added after the $V_2O_5$ has been dissolved. The drying and activation will result in a formation of sulfuric acid mists if the following compounds are contained in the impregnating solution and, as a result, in the impregnated carrier bodies: vanadyl sulfate ($VOSO_4$), free sulfuric acid and acid alkali sulfates (e.g., $KHSO_4$), and if the total $SO_4$ content thereof exceeds the amount required to form neutral alkali sulfates. Neutral alkali sulfates (such as $K_2SO_4$) will not be decomposed and for that reason will not release $SO_3$.

If the total $SO_4$ content of the impregnating solution does not exceed the stoichiometric amount corresponding to the $SO_4$ content of all alkali compounds if they consist of neutral salts, there will be no evolution of sulfuric acid mists. During the activation the vanadyl salts are converted to $V_2O_5$ with elimination of the acid residue. If the acid and the reducing agent do not contain sulfur, it will be desirable to add all alkalies in the form of sulfates. Sulfates are less expensive than organic salts and during the drying and activation any organic salts will form carbonates which have a basic activity and if present in increasing amounts will chemically attack the carrier consisting of $SiO_2$. If the $SO_4$ is contained in the acid and in the reducing agent, correspondingly less alkali sulfates will be used and the remainder will be added as organic alkali salts. The ratio of alkalis to vanadium in the catalyst will generally be adjusted to 2 to 4 moles alkali per mole vanadium.

The following reactions may take place during the drying and activation of the impregnated carrier bodies (as organic acids or alkali salts, formic acid and its salts and potassium as an alkali will be cited by way of example):

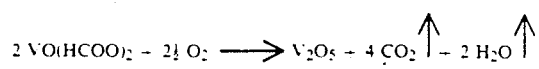

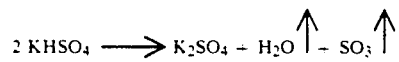

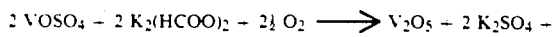

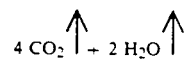

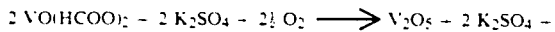

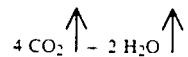

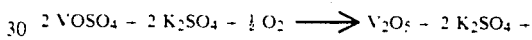

It is apparent that in the presence of $SO_4$ there will be no formation of sulfuric acid mists if the molar ratio of alkali metal to $SO_4$ is equal to or higher than 2.

According to a preferred feature one-half of the amount of $SO_4$ required to form $VOSO_4$ is added as sulfuric acid to the aqueous medium and an $SO_2$-containing gas is introduced into the aqueous medium until the $V_2O_5$ has been dissolved. In that case the dissolution will take place according to the following reaction equation:

The added sulfuric acid will result in a fast dissolution of the $V_2O_5$ from the beginning. The second half of the required amount of $SO_4$ will be formed by the reaction of $V_2O_5$ with $SO_2$. An $SO_2$-containing roaster gas is preferably used as a gas. When the $V_2O_5$ has been dissolved, the introduction of $SO_2$ is terminated because a prolonged introduction in the presence of oxygen might result in a formation of small amounts of sulfuric acid. Roaster gas may be used as an $SO_2$-containing gas. Any roaster gas which is available will be inexpensive. Besides, the weak $SO_2$ gas which escapes from the aerating equipment can be recycled to the roaster gas stream. This will also be the case with $SO_2$-laden stripper gas.

According to a preferred feature the aqueous medium in which the $V_2O_5$ has been dissolved is stripped to remove surplus $SO_2$. Because the $SO_2$ which has been introduced into the aqueous medium is initially dissolved in water, all solutions thus prepared will contain dissolved $SO_2$, which during the impregnation will enter the catalyst and which will be expelled as sulfuric acid mist during the drying and activation. Such expulsion will be prevented by the stripping.

The $SO_2$ can generally be driven off with any gas which will not react with the solution and such gas may consist, e.g. of flue gas from the combustion of fossile fuels. If air is employed, some $SO_2$ may be oxidized to form $SO_3$ or $H_2SO_4$ so that the solution will have slightly higher $H_2SO_4$ contents. The $SO_2$-containing stripper gas may be directly reacted with a $V_2O_5$ suspension or may be stripped with alkaline solutions, e.g. of hydroxides or carbonates, to remove the $SO_2$. The thus desulfurized stripper gas may either be reused for stripping or may be discharged into the atmosphere without hesitation. The scrubbing solution (e.g., $KHSO_3$ solution) laden with $SO_2$ may be used in the production of additional impregnating solution.

According to a preferred feature a part of the alkalis is used in the form of organic salts approximately in the amount which is stoichiometrically required to bind sulfur in the amount which has been added to dissolve the $V_2O_5$, and the remainder of the alkalis is added as neutral sulfates to the solution. As a result, the catalyst will contain no volatile $SO_4$ compounds, which could be expelled as sulfuric acid mists.

According to a preferred feature the amount of water which is employed in the aqueous medium is much smaller than the sum of the amounts of water which are theoretically required to dissolve the respective salts contained in the impregnating solution if all cations are regarded as sulfates. The amount of water which in accordance with the literature is theoretically required to dissolve alkali sulfates and $VOSO_4$ is apparent from the following table.

TABLE I

| Solution Equilibria (in % by weight of the compound, difference to 100 = % by weight $H_2O$) | | | | | | |
|---|---|---|---|---|---|---|
| | 0° C | 20° C | 40° C | 60° C | 80° C | 100° C |
| $K_2SO_4$[1] | 7.0 | 10.0 | 12.7 | 15.2 | 17.5 | 19.4 |
| $Cs_2SO_4$[1] | 62.5 | 64.0 | 65.5 | 66.5 | 68.0 | 69.0 |
| $VOSO_4$[2] | 36 | 39 | 43 | 48 | 52 | 55 |
| $Na_2SO_4$ | 4.4[1] | 16.2[1] | 32[3] | 31[3] | 30[3] | |
| $Rb_2SO_4$[1] | 26.6 | 32.5 | 36.6 | 40.5 | 42.9 | 45.0 |

[1]From D'Ans-Lax, 1967, pp 1101 et seq
[2]From Gmelin, 48 [B], p 291, FIG 40From D'Ans-Lax, 1949, p 918

For the determination of the concentration of the sulfates in the impregnation solution in accordance with the invention it will be assumed that the required amount of water corresponds to the sum of the individual amounts which are apparent from the above table if salts which are not present as sulfates are arithmetically converted to sulfates.

| An impregnating solution composed of 275.3 g/l $VO(COO)_2$ corresponding to |
|---|
| 289.5 g/l $VOSO_4$ |
| 328.8 g/l $K_2SO_4$ |
| 120.5 g/l $Cs_2SO_4$ |
| 738.8 g/l salts | had a practical water demand of 811.2 g/l, which corresponded to a salt concentration of 47.7% by weight. That solution was stable for a long time even at 20° C.

The theoretical water demand which is apparent from Table 1 according to the literature is:

| | Theoretical $H_2O$ demand in g/l according to Table 1 | | |
|---|---|---|---|
| | 20° C | 60° C | 100° C |
| 289.5 g/l $VOSO_4$ | 452.6 | 313.6 | 236.9 |
| 328.8 g/l $K_2SO_4$ | 2959.2 | 1834.4 | 1366.0 |
| 120.5 g/l $Cs_2SO_4$ | 67.8 | 60.7 | 54.1 |
| 738.8 g/l salts | 3479.8 | 2208.7 | 1657.0 |
| Theoretical salt concentration, % | 17.5 | 25.1 | 30.8 |

It is apparent from the above that the process in accordance with the invention surprisingly can be used to prepare solutions which are much more highly concentrated than was to be expected in view of the literature. The simplified assumption is quite permissible because even in the theoretical case that no water at all is required to dissolve $VO(COO)_2$ the practical water demand will be only about 25% of the theoretical water demand. The content of the active substances in the catalyst will depend on the concentration of the impregnating solution and on the absorbency (porosity) of the carrier. Because the porosity of the carrier is fixed and is limited and because sulfuric acid catalysts are required to have high contents of active substances, the impregnating solutions must have the highest possible concentrations if the active substance are to be applied by a one step impregnation.

According to a preferred feature the amount of water employed is less than 80% of the theoretical water demand.

According to a preferred feature the amount of water employed is less than 40% of the theoretical water demand.

The invention provides also a process of producing an aqueous impregnating solution which contains vanadium salts and alkali salts, characterized in that fine-grained $V_2O_5$ is dissolved in an acid aqueous medium with addition of a reducing agent and a reduction to form $VO^{2-}$ is effected, acid and reducing agent are used in approximately stoichiometric amounts for the dissolution and reduction of $V_2O_5$, the alkalis are used in the form of salts and the solution is adjusted to contain $SO_4$ in an amount which is at least as large as the amount which is stoichiometrically required to combine the alkalis in neutral sulfates, and water is employed in an amount which is much smaller than the sum of the amounts of water which are theoretically required to dissolve the respective salts contained in the impregnating solution if all cations are regarded as sulfates. Although the concentration of active substances in the impregnating solutions is very high, the solutions can be stored for long times without an occurrence of precipitation.

According to a preferred feature the amount of water employed is less than 40% of the theoretical water demand.

SPECIFIC EXAMPLES

Example 1 (comparison example)

Assuming that a catalyst had an initial composition of:

| | |
|---|---|
| $V_2O_5$ | 8.00% by weight |
| $K_2SO_4$ | 19.16% by weight |
| Carrier Body | 72.84% by weight | and that a carrier having an absorbance of 68% (68 ml impregnating solution per 100 g carrier body) was used it was desired to produce a catalyst in which 15 mole percent of the $K_2SO_4$ content have been replaced by $Cs_2SO_4$. For this reason the impregnating solution must contain:

161.5 g/l V compounds calculated as $V_2O_5$
328.8 g/l K compounds calculated as $K_2SO_4$
120.5g/l Cs compounds calculated as $Cs_2SO_4$ The S content of the solution which does not, in accordance with the invention, result in an emission of $SO_x$ and corresponds to the $SO_4$ that is bound to the alkalis in neutral sulfates, amounts to 217.7 g/l, calculated as $H_2SO_4$. If the impregnating solution contains S compounds in excess of the above, they will be emitted entirely or in part during the drying and activation of the catalyst in dependence on the conditions employed.

The required impregnating solution was prepared in accordance with EP 047540 and in addition to water contained:

161.5 g/l $V_2O_5$
328.8 g/l $K_2SO_4$
120.5 g/l $Cs_2SO_4$
900 g/l $H_2SO_4$

That impregnating solution had a total S content of 1117.7 g/l, calculated as $H_2SO_4$, which by 900 g/l $H_2SO_4$ exceeded the amount which in accordance with the invention will be permissible if an emission of $SO_x$ is to be avoided.

The prefabricated carrier was impregnated with that solution and was then dried at 300° C. As a result, $H_2SO_4$ mist was evolved in considerable amounts. The dried catalyst was then subjected to an activation in accordance with EP 015823 (muffle furnace, 775° C., 1 hour), which again resulted in an evolution of $SO_x$ ($SO_2$ $SO_3$, $H_2SO_4$) in considerable amounts.

An analysis of the finally obtained catalyst revealed an S:V weight ratio of 0.88, from which the residual amount of 243.5 g/l $H_2SO_4$ in the catalyst can be calculated with reference to the impregnating solution employed. This means an $SO_x$ emission of 874.2 g $H_2SO_4$/l (1117.7 g minus 243.5 g). Amounting to 243.5 g $H_2SO_4$ per liter of the impregnating solution, the residual S content of the catalyst was about 12% higher than the minimum amount of 217.7 g/l required in accordance with the invention (and consisting of the amount which was stoichiometrically required to combine with the alkalis so as to form neutral sulfates).

EXAMPLE 2

The catalyst described in Example 1 was to be produced in such a manner that the emission of polluting $SO_2$ gases was to be minimized in accordance with the invention.

Sulfuric acid and sulfur dioxide were employed as the acid and reducing agent required in accordance with the invention (to dissolve the $V_2O_5$). Together with water, chemicals are theoretically required in the following amounts for the production of 1 liter of impregnating solution:

328.8 g $K_2SO_4$
301.25 g $Cs_2SO_4$ solution (40% in water)
161.5 g $V_2O_5$
89.78 g $H_2SO_4$ (97%, 1 mole $H_2SO_4$/mole $V_2O_5$)
56.88 g $SO_2$ (1 mole/mole $V_2O_5$)

For making an estimate of the generation of heat and for a simulation of a larger charge (with a negligibly small heat loss), the process was carried out in a Dewar flask, which was provided with a thermometer, a stirrer, an $SO_2$ feed pipe and a reflux condenser, which were gas-tightly connected by means of rubber plugs having suitable bores so that the loss of water and the ingress of air were kept within limits.

$SO_2$ at a rate of 30 sl/h (sl = standard liter) was introduced into the initial charge consisting of 600 g distilled $H_2$, 89.8 g 97% $H_2SO_4$ and 161.5 g $V_2O_5$ powder (Merck) and the temperature rise from an initial value of 26° C. was monitored as an indication of the progress of the reaction. A temperature maximum of 91° C. was reached after 75 minutes. After a total of 4 hours the temperature had been decreased to 65° C. and the dissolving process was terminated. The $V_2O_5$ had been entirely dissolved. It is apparent that the dissolving time which is actually required is between 1.5 and 4 hours. 301.3 g 40% $Cs_2SO_4$ solution and 328.8 g $K_2SO_4$ were subsequently added and the resulting mixture was at a temperature of about 50° C. After the mixture had been stirred for 1 hour the salt had not yet been entirely dissolved but there was an undissolved residue in an estimated amount of 100 to 200 g (at 45° C.). When the mixture was heated in steps of 10° C. and was held after each step for 1 hour, an almost complete dissolution (undissolved residue about 10%) had been achieved at 80° C. and the entire salt had been dissolved at 90° C.

The solution remained clear when it had been cooled to room temperature. About 25 ml water were then added to fill up the solution to 1000 ml. The density was 1548 g/l at 21° C. A clear solution was obtained although this could not have been expected because the solution equilibrium of $K_2SO_4$ amounts to only 10.0% by weight at 20° C. (balance water). In the example that value was in excess of 30%.

The solution was analyzed and the values were compared with the weighed-in amounts.

|  |  | Weighed-in amount | Analysis |
|---|---|---|---|
| V (as $V_2O_5$) | g/l | 161.5 | 162 |
| K (as $K_2SO_4$) | g/l | 328.8 | 330 |
| Cs (as $Cs_2SO_4$) | g/l | 120.5 | 120 |
| S (as $H_2SO_4$) | g/l | 391.9* | 443.6 |

*inclusive of the stoichiometric amount resulting from the reduction of $V_2O_5$ with $SO_2$ It is apparent that within the analysis tolerances the contents of V, K, and Cs correspond to the weighed-in amounts and the S content exceeds the calculated value by about 13%. This showed that the use of $SO_2$ in a surplus had caused a part of it to remain in solution. That solution and the prefabricated carrier were used to produce a catalyst in the manner described in Example 1. Drying at 300° C. did not cause visible $H_2SO_4$ mists to escape and a very small amount of $H_2SO_4$ mist was evolved during the activation at 775° C.. This shows that the visual emission of $SO_x$ had been almost entirely eliminated.

The analysis of the finally obtained catalyst revealed an S:V weight ratio of 0.86. From this, $SO_4$ residue (calculated as $H_2SO_4$) in the catalyst can be calculated with reference to the impregnating solution which had been fed to amount to 238.0 g/l. This corresponds to an emission of $SO_x$—calculated as $H_2SO_4$—of 205. g/l (443.6 g minus 238.0 g). By the use of the process in accordance with the invention the emission of $SO_x$ —calculated as $H_2SO_4$—was decreased from 874.2 g/l in Example 1 to 205.6 g/l, which means a decrease of the emission by 76.5%. The carrier body can have any composition conventional in the art and enabling impregnation and used for contact catalysis to convert $SO_2$ to $SO_3$ in a fixed or fluidized bed. The product could be used in either of these conventional contact catalyst systems (see the references cited previously herein).

EXAMPLE 3

The process was carried out as in Example 2. But the Dewar vessel was replaced by a stirred vessel as is usually employed in laboratories. That vessel was heatable and was equipped with a reflux condenser in order to avoid losses by evaporation. The aeration and stripping were effected by means of a deeply immersed frit tube. When the $V_2O_5$ had been dissolved, the V solution was aerated with $N_2$ for one hour with stirring while the temperature was raised to about 90° C. and the dissolved $SO_2$ in solution was substantially completely expelled. The expulsion of $SO_2$ will be the more effective the higher is the temperature. When $K_2SO_4$ and $Cs_2SO_4$ had been added the prepared impregnating solution contained 393.0 g/l S, calculated as $H_2SO_4$. The analysis of the finally obtained catalyst revealed an S:V weight ratio of 0.87, from which the residual amount of $H_2SO_4$ in the catalyst was calculated with reference to the impregnating solution employed as 240.7 g/l. This means that the emission of $SO_x$—calculated as $H_2SO_4$—amounted to 152.3 g/l (393.0 g minus 240.7 g). The emission of $SO_x$ was decreased further by the expulsion of $SO_2$ from solution.

EXAMPLE 4

600 ml water, 89.8 g 97% $H_2SO_4$ and 161.5 g $V_2O_5$ were charged into the apparatus described in Example 3 and a roaster gas containing 12% by volume $SO_2$, 9% by volume $O_2$ and 79% by volume $N_2$ was introduced at a rate of 250 sl/h. The $V_2O_5$ had been entirely dissolved after about 3 hours. Thereafter $SO_2$ was expelled from solution as described in Example 3. $K_2SO_4$ and $Cs_2SO_4$ were subsequently added in analogy to Example 2 and the solution was filled up with water to 1000 ml (density 1550 g/l at 20° C.) The analysis of the solution revealed a content of 392.0 g/l S, calculated as $H_2SO_4$.

The solution was stable at room temperature for many days and was processed further as described in the preceding examples. The resulting catalyst had an S:V weight ratio of 0.88. From this a residual amount of 243.5 g/l $H_2SO_4$ in the catalyst and an emission of 148.5 g/l $SO_x$ (calculated as $H_2SO_4$) (392.0 minus 243.5 g) can be calculated.

EXAMPLE 5

The apparatus described in Example 3 was charged with
600 ml water
161.5 g $V_2O_5$ powder
When the charge had been heated to 80° C.,
341.2 g citric acid (2 moles per mold of $V_2O_5$) were added with stirring within about 0.5 hour. This resulted in a frothing and an evolution of $CO_2$ and the known deeply blue solution was formed owing to the presence of the $VO^{2+}$ ion. In that case the citric acid acted both as a reducing agent and as an acid (solvent). If 2 moles citric acid were used per mole of $V_2O_5$ the $V_2O_5$ was virtually entirely disolved at 80° C. A surplus of citric acid will not be harmful. If less citric acid is employed, a proportionately smaller amount of $V_2O_5$ will be dissolved. If 1.0 mole of citric acid is used per mole of $V_2O_5$, only 50% of the $V_2O_5$ will be dissolved. The elevated temperature is highly important. Even high surpluses of citric acid did not result in a complete solution of $V_2O_5$ at room temperature. The following were subsequently added:
328.8 g $K_2SO_4$
301.3 g 40% $Cs_2SO_4$ solution These additions were entirely dissolved as a result of stirring at 80° to 90° C. When the solution had cooled to room temperature, it was filled up with water to 1000 ml. In spite of its high salt concentration the solution could be stored at room temperature for many days without crystallization.

The analysis of the solution revealed an S content which was equal to the amount stoichiometrically required for the formation of neutral alkali sulfates. The solution was processed to form a catalyst as in the preceding examples. Neither the drying nor the activation resulted in an emission of $SO_x$ which could be detected visually or by an analysis of the catalyst.

Instead of citric acid, oxalic acid $(COOH)_2$ and tartaric acid $(COOH \times CH(OH) \times CH(OH) \times COOH)$ were used and both acted like citric acid both as a reducing agent and as a solvent (acid). Like citric acid, the action of tartaric acid at low temperature was slow and incomplete. That effect was not so pronounced with oxalic acid but a higher temperature was also more desirable in that case. At least 1.5 moles tartaric acid or 3.0 moles oxalic acid are required per mole $V_2O_5$ for a complete dissolution of the $V_2O_5$. A surplus was not harmful in either case. To dissolve the $V_2O_5$ as fast and as completely as possible and to improve the stability of the highly supersaturated solutions it is recommendable to use the acid in a small surplus of up to 15%.

EXAMPLE 6

200 ml water, 161.5 g $V_2O_5$ and 143.6 g 97% $H_2SO_4$ were charged into the apparatus described in Example 3. 57.8 g hydrazinium sulfate ($N_2H_4 \times H_2SO_4$) were added to the solution while it was stirred at about 80° C. This caused the solution to froth with evolution of gas. After an after-reaction time of about 1 hour the progressively decreasing evolution of gas had been terminated and the $V_2O_5$ had been entirely dissolved.

In parallel experiments, two additional clear solutions were prepared, which consisted of:
Solution 1:
199.3 g KOH
166.8 g 98% formic acid (HCOOH)
100 g water
Solution 2:
19.3 g $K_2SO_4$
301.3 g 40% $Cs_2SO_4$ solution The two solutions were heated to 80° C. and were then consecutively stirred into the V solution. The mixed solution remained clear. In the usual manner it was permitted to cool down to room temperature and was then filled up with water to 1000 ml. In spite of its high salt concentration the solution could be stored and processed at room temperature.

Owing to the pressure of $H_2SO_4$ in a slight surplus, the finally prepared solution contained 226.4 g/l S, calculated as $H_2SO_4$. During the production of a catalyst there was no escape of $SO_x$ gases during the drying nor during the activation. This was confirmed by the analysis of the finally obtained catalyst. From the S:V weight ratio of 0.82 revealed by the analysis it was possible to determine by calculation with reference to the impregnating solution employed that the residue left in the catalyst (calculated as $H_2SO_4$) amounted to 226.9 g/l. In a comparison with the content of 226.4 g/l $H_2SO_4$ of the solution this means that a measurable amount of $H_2SO_4$ had not been released.

Instead of the formic acid used to prepare solution 1, an equivalent amount of another organic acid may be used, e.g., 223.9 g $(COOH)_2 \times 2H_2O$ (crystalline oxalic acid) or 248.8 g $H_3 \times C_6H_5O_7 \times H_2O$ (crystalline citric acid). It is possible to use instead of sulfuric acid, e.g., the equivalent amount of an organic acid which is not reactive with $V_2O_5$. In that case a correspondingly larger amount of alkali sulfate must be added to ensure that the solution contains $SO_4$ in the amount required for the formation of neutral alkali sulfates.

I claim:

1. A process for producing a catalyst containing vanadium oxide compounds and alkali compounds and capable of oxidizing $SO_2$ to $SO_3$, comprising the steps of:
   (a) forming an impregnating solution by dissolving fine-grain $V_2O_5$ in an aqueous acid medium containing a reducing agent effective to form $VO^{2+}$ and with an acid and said reducing agent in approximately stoichiometric amounts for the dissolution and reduction of the $V_2O_5$, said solution containing alkalis adapted to form said alkali compounds in the form of salts;
   (b) adjusting said solution so that it contains $SO_4=$ in an amount sufficient to combine all of said alkalis in said solution in the form of neutral sulfates upon impregnation of said solution into prefabricated carrier bodies and during subsequent drying and activation of impregnated carrier bodies;
   (c) impregnating prefabricated carrier bodies with the impregnating solution of step (b) to form solution-impregnated carrier bodies;
   (d) drying said solution-impregnated carrier bodies at an elevated temperature to form catalyst bodies; an
   (e) activating said catalyst bodies by heating same under oxidizing conditions to a temperature of 750° to 1000° C. to produce a catalyst containing vanadium oxide compounds and alkali compounds and capable of oxidizing $SO_2$ to $SO_3$.

2. The process defined in claim 1 wherein approximately half of the $SO_4=$ required to form $VOSO_4$ from the vanadium in said solution is added to said solution in the form of sulfuric acid and $SO_2$-containing gas is introduced into said medium until said $V_2O_5$ has been dissolved therein.

3. The process defined in claim 2, further comprising the step of stripping surplus $SO_2$ from said solution after said $V_2O_5$ has been dissolved therein.

4. The process defined in claim 1 wherein a part of said alkalis is supplied to said solution in the form of organic salts approximately in an amount stoichiometrically required to bind sulfur in an amount added to said solution to dissolve said $V_2O_5$, the balance of said alkalis being added as neutral sulfates to said solution.

5. The process defined in claim 1 wherein the amount of water employed in said solution is much smaller than the amounts of water theoretically required to dissolve the respective salts contained in the impregnating solution calculating all cations as respective sulfate salts.

6. The process defined in claim 5 wherein the amount of water employed in said solution is less than 80% of the amounts of water theoretically required to dissolve the respective salts contained in the impregnating solution calculating all cations as respective sulfate salts.

7. The process defined in claim 6 wherein the amount of water employed in said solution is less than 40% of the amounts of water theoretically required to dissolve the respective salts contained in the impregnating solution calculating all cations as respective sulfate salts.

8. A process for producing a catalyst containing vanadium oxide compounds and alkali compounds and capable of oxidizing $SO_2$ to $SO_3$, comprising the steps of:
   a) forming an impregnating solution by dissolving fine-grain $V_2O_5$ in an aqueous acid medium containing a reducing agent effective to form $VO^{2+}$ and with an acid and said reducing agent in approximately stoichiometric amounts for the dissolution and reduction of the $V_2O_5$, said solution containing alkalis adapted to form said alkali compounds in the form of salts;
   (b) adjusting said solution so that it contains $SO_4=$ in an amount sufficient to combine all of said alkalis in said solution in the form of neutral sulfates upon impregnation of said solution into prefabricated carrier bodies and during subsequent drying and activation of impregnated carrier bodies;
   (c) controlling the amount of water in said solution so that the amount of water employed in said solution is much smaller than the amounts of water theoretically required to dissolve the respective salts contained in the impregnating solution calculating all cations as respective neutral sulfate salts;
   (d) impregnating prefabricated carrier bodies with the impregnating solution of step (c) to form solution-impregnated carrier bodies;
   (e) drying said solution-impregnated carrier bodies at an elevated temperature to form catalyst bodies; and
   (f) activating said catalyst bodies by heating same under oxidizing conditions to a temperature of 750° to 1000° C. to produce a catalyst containing vanadium oxide compounds and alkali compounds and capable of oxidizing $SO_2$ to $SO_3$.

9. The process defined in claim 8 wherein the amount of water employed in said solution is less than 80% of the amounts of water theoretically required to dissolve the respective salts contained in the impregnating solution calculating all cations as respective sulfate salts.

10. The process defined in claim 9 wherein the amount of water employed in said solution is less than 40% the amounts of water theoretically required to dissolve the respective salts contained in the impregnating solution calculating all cations as respective sulfate salts.

11. A catalyst containing vanadium oxide compounds and alkali compounds and capable of oxidizing $SO_2$ to $SO_3$ and made by the process of claim 1.

12. A catalyst containing vanadium oxide compounds and alkali compounds and capable of oxidizing $SO_2$ to $SO_3$ and made by the process of claim 8.

13. A process for producing an aqueous impregnating solution containing vanadium salts and alkali compounds, comprising the steps of:
   (a) forming a solution by dissolving fine-grain $V_2O_5$ in an aqueous acid medium containing a reducing agent effective to form $VO^{2+}$ and with an acid and said reducing agent in approximately stoichiometric amounts for the dissolution and reduction of the $V_2O_5$, said solution containing alkalis adapted to form said alkali compounds in the form of salts;

(b) adjusting said solution so that it contains $SO_4^=$ in an amount sufficient to combine all of said alkalis in said solution in the form of neutral sulfates; and adjusting the amount of water employed in said solution to be much smaller than the amount of water theoretically required to dissolve the respective salts contained in the impregnating solution calculating all cations as respective sulfate salts.

* * * * *